May 4, 1926.
E. DE L. H. MOLINA ET AL
1,583,602
LEAD SEAL
Filed Feb. 14, 1923
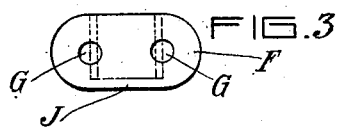
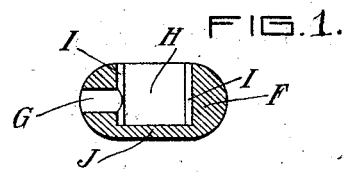
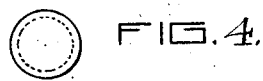
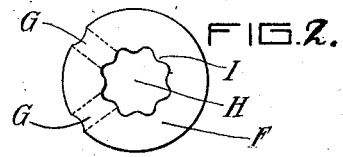
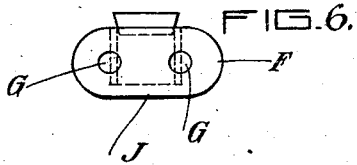
Inventors
E. de las Heras Molina
L. Bonet Alcantarilla
by
W. E. Evans
Attorney.

Patented May 4, 1926.

1,583,602

UNITED STATES PATENT OFFICE.

EUGENIO DE LAS HERAS MOLINA AND LUÍS BONET ALCANTARILLA, OF JAEN, SPAIN.

LEAD SEAL.

Application filed February 14, 1923. Serial No. 618,983.

*To all whom it may concern:*

Be it known that we, EUGENIO DE LAS HERAS MOLINA, and LUÍS BONET ALCANTARILLA, subjects of the King of Spain, residing, respectively, at 1 rue Martinez Molina, Jaen, Spain, and 11 rue Ruiz Romero, Jaen, Spain, have invented certain new and useful Improvements in and Relating to Lead Seals, of which the following is a specification.

The present invention relates to a safety seal which has for its purpose to ensure against the unauthorized unpacking of the goods upon which it is placed whereby if the packets, cases or receptacles containing the goods have been opened, the consignee can perceive the fact by the mere examination of the safety seal.

The safety seal comprises a piece of lead or other ductile material having a recess adapted to receive the knot or connected ends of the sealing cord, wire or any other binder, the said recess being closed, once the knot has been introduced, with lead or other material of which the said piece is composed or separate therefrom, and adapted to receive the impression of a stamp or seal.

In sealing the cover of the recess, where the connected ends of the sealing cord are disposed, with a seal of considerable surface and with a suitable pressure, the seal is impressed both on the cover and on the main part of the seal, the whole having then the appearance of a single jointless piece; and as from that time it is necessary more or less to destroy the safety seal in order to withdraw the ends of the cord disposed in the interior of the latter and embedded under the seal, a mere glance is sufficient to make clear that the article has been tampered with.

In the accompanying drawings is represented by way of example one construction of the safety seal according to the invention.

Figure 1 is a cross section of a safety seal according to the invention.

Figure 2 is a corresponding plan view, and

Figure 3 is a side elevation.

Figures 4 and 5 are views of the cover in plan and in cross section.

Figure 6 shows the closing of the seal.

In the drawings F is a capsule, and G represent the openings through which pass the ends of the sealing cord which are received in the recess H formed with lateral grooves I. Once the knot or connected ends of the sealing cord, cable or binder has been introduced into the recess or hole H, the latter is closed with the cover represented in Figures 4 and 5, respectively in plan and cross section, and the whole is then in condition to receive the seals on the surfaces formed by the cover of the capsule F and the base J (Figure 6). They are compressed by the pressure of the seal and the material of the cover becomes embedded in the grooves of the recess and the whole forms thus, in appearance, a single body.

We claim:

A safety seal consisting of a hollow body of ductile metal having an open recess therein forming a surrounding peripheral wall, in which recess the knots or ends of the binding cord may be inserted, the inner face of the said surrounding peripheral wall being irregularly formed, means in the said surrounding peripheral wall through which the binding cord may pass and a cover for the recess of the said hollow body, the said cover also being made of ductile metal and being adapted so that the metal of the cover enters the irregularities on the inner face of the said surrounding peripheral wall on compression of the said cover and hollow body in sealing.

EUGENIO DE LAS HERAS MOLINA.
LUÍS BONET ALCANTARILLA.